US011284569B1

(12) United States Patent
Wang

(10) Patent No.: US 11,284,569 B1
(45) Date of Patent: Mar. 29, 2022

(54) FIXING STRUCTURE FOR COLLECTING AND ASSEMBLING FLOWER

(71) Applicant: CHU HSING METAL CO., LTD., Changhua County (TW)

(72) Inventor: Kuan-Chuan Wang, Changhua County (TW)

(73) Assignee: CHU HSING METAL CO., LTD., Changhua County (TW)

( * ) Notice: Subject to any disclaimer, the term of this patent is extended or adjusted under 35 U.S.C. 154(b) by 39 days.

(21) Appl. No.: 17/074,363

(22) Filed: Oct. 19, 2020

(51) Int. Cl.
*A01G 9/00* (2018.01)
*A01G 9/02* (2018.01)
*A01G 27/02* (2006.01)

(52) U.S. Cl.
CPC ............. *A01G 9/028* (2013.01); *A01G 27/02* (2013.01)

(58) Field of Classification Search
CPC .. A01G 9/028; A01G 2009/003; A01G 27/02; A01G 27/06; A01G 9/02; A01G 9/021; A01G 9/024; A01G 9/042; B65D 5/50; B65D 5/52
See application file for complete search history.

(56) References Cited

U.S. PATENT DOCUMENTS

| 2017/0202161 | A1* | 7/2017 | Eckert | ..................... A01G 27/06 |
| 2019/0098847 | A1* | 4/2019 | Paternostre | ............ A01G 31/02 |
| 2019/0289802 | A1* | 9/2019 | Herbert | .................. A01G 27/06 |

\* cited by examiner

*Primary Examiner* — Joshua E Rodden
*Assistant Examiner* — Henry Hooper Mudd
(74) *Attorney, Agent, or Firm* — Chun-Ming Shih; Labway IPR Services

(57) ABSTRACT

The present invention provides a fixing structure for collecting and assembling flower, especially used for collecting and placing potted plants such as potted orchids, mainly including a flower holder main body and a collecting sleeve assembly sleeved at a top end of the flower holder main body; a central accommodating slot and position limiting members annularly arranged along an inner edge are formed in the collecting sleeve assembly, two crossed adjacent abutting surfaces are respectively formed in the plurality of position limiting members, and an outer edge of central accommodating slot is formed with concave arc-shaped abutting surfaces at locations corresponding to the adjacent position limiting members, and the position limiting members is connected to a bottom edge of the central accommodating slot via a rib sheet, so that an accommodating slot zone is formed through each set of the three abutting surfaces.

5 Claims, 8 Drawing Sheets

US 11,284,569 B1

FIXING STRUCTURE FOR COLLECTING AND ASSEMBLING FLOWER

FILED OF THE INVENTION

The present invention relates to a fixing structure for collecting and assembling flower, in which a design of a flower holder main body and a collecting sleeve assembly sleeved at a top end of the flower holder main body is provided, and a central accommodating slot disposed in the collecting sleeve assembly and accommodating slot zones consisted of a plurality of position limiting members are served to allow potted plants, for example orchids, to be place for forming an assembled flower bonsai, so that the assembling operation of the flower bonsai is provided with advantages of being fast and easy, thereby solving the problems and disadvantages existed in the conventional operation modes.

BACKGROUND OF THE INVENTION

Generally, fresh flower bonsai are used on occasions such as a wedding, a funeral, a new housing party or a grand opening of a company, and fresh flowers are commonly used for decorating the occasions, wherein orchids are adopted as the above-mentioned flower bonsai. Speaking of the planting of orchid, a soft pot planting means is often adopted, when a flower bonsai is desired to be collected and assembled, a predetermined amount of the orchids are selected according to actual needs so as to be integrally assembled in a proper flower holder, meanwhile a growing status of flower spikes shall be put in considers for being properly adjusted and matched so as to provide a better visual effect, thereby achieving an objective of assembling the desired flower bonsai.

In the collecting and assembling operation of the flower bonsai, a flowerpot having a proper size is selected as the flower holder, and an on-floor flowerpot or vase having a large size is often selected for providing a magnificent sensation and atmosphere; however, because the size of the flower holder is very different from that of the potted orchid, the potted orchid is unable to be directly disposed in the flower holder, other materials or wastes, for example styrofoam or waste fabrics, are required to be firstly disposed in the flower holder with a certain height, then the desired potted orchids bonsai are placed therein; because the flower holder is not provided with a proper fixing structure, different materials are filled for fixing the potted orchids during the placing and assembling process, meanwhile the vertical directions of the potted orchids and the directions of the flower spikes are adjusted for presenting an ideal status, thus the assembling and adjusting operation can only be achieved by an experienced personnel.

In view of the above, the collecting and assembling operation for the fresh bonsai, for example the orchid bonsai, can only be achieved by the experienced personnel, thus the labor cost is inevitably high; moreover, the means of filling different materials in the flower holder would cause the material cost and the environmental protection issues, the flower holder is formed through a ceramic material being processed with a firing treatment, thus the cost is high, and another problem of subsequent transportation and process shall also be concerned, accordingly, the above-mentioned shortages and disadvantages shall be improved by the skilled people in the art.

SUMMARY OF THE INVENTION

In view of the conventional collecting and assembling operation for the flower bonsai, the flower holder is not provided with a fixing structure and different materials are required to be fill for increasing the height and fixing the potted orchids, so that only the experienced personnel can perform the operation; based on the above-mentioned shortages and disadvantages, the applicant of the present invention has devoted himself for developing a fixing structure for collecting and assembling flower having advantages of being fast and easy.

For satisfying a positioning requirement for the collecting and assembling operation of the potted orchids, the present invention provides a structural design of a flower holder main body being sleeved with a collecting sleeve assembly at a top end thereof for a purpose of replacing the convention flower holder, a central accommodating slot designed in the collecting sleeve assembly is able to work with accommodating slot zones consisted of a plurality of position limiting members arranged at a periphery for allowing potted plants, for example potted orchids, to be disposed so as to be collected and assembled as a flower bonsai.

Accordingly, the present invention provides a fixing structure for collecting and assembling flower, with a two-piece design of a flower holder main body and a collecting sleeve assembly, and accommodating slot zones formed in the collecting sleeve assembly, thus there is no need of filling various waste materials during a collecting and assembling operation for potted plants, thus the placing assembly can be easier to be achieved, and no professional personnel is required for the assembling operation, thereby greatly reducing the material cost and the labor cost, meanwhile the flower holder main body and the collecting sleeve assembly are recyclable, so that problems and disadvantages existed in the conventional operating modes can be effectively solved.

Figure 1:
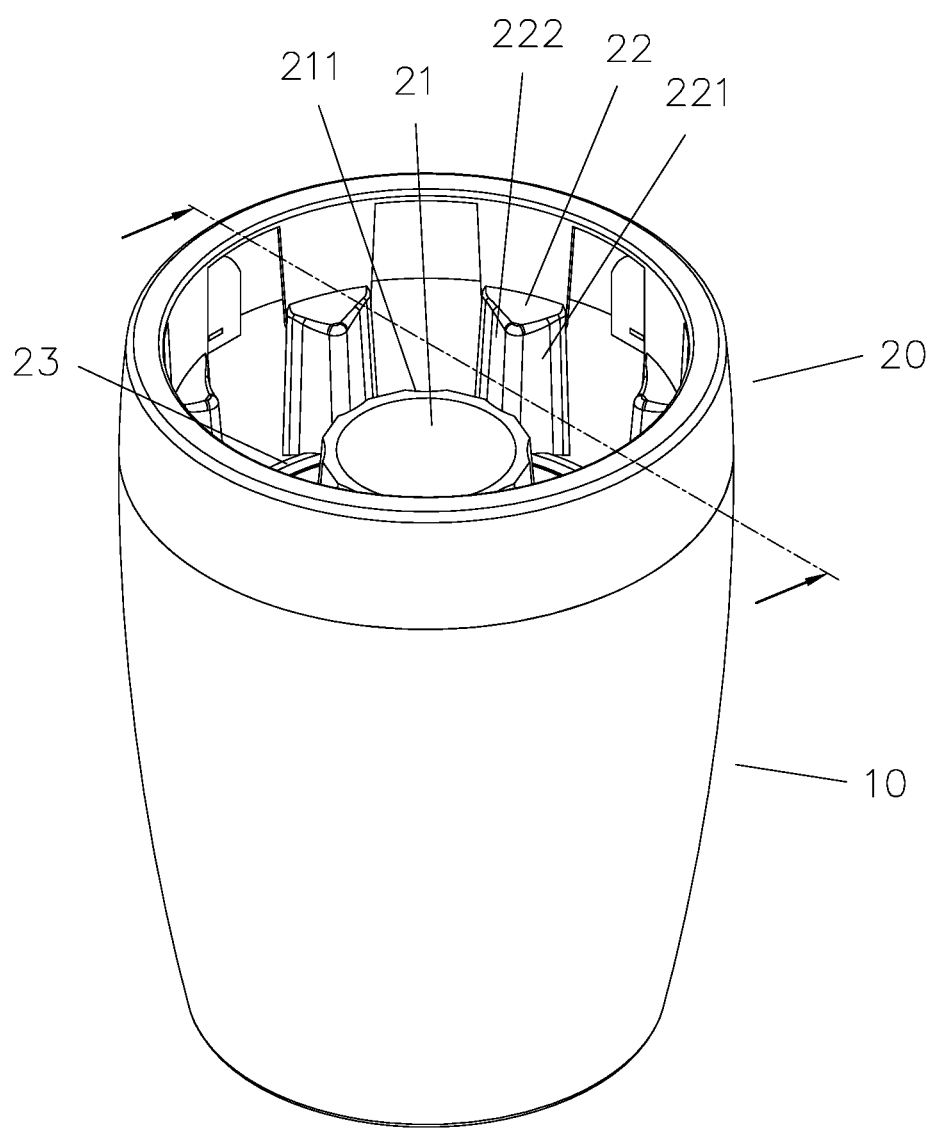
FIG. 1 is a schematic view showing the structure according to one preferred embodiment of the present invention.
Figure 2:
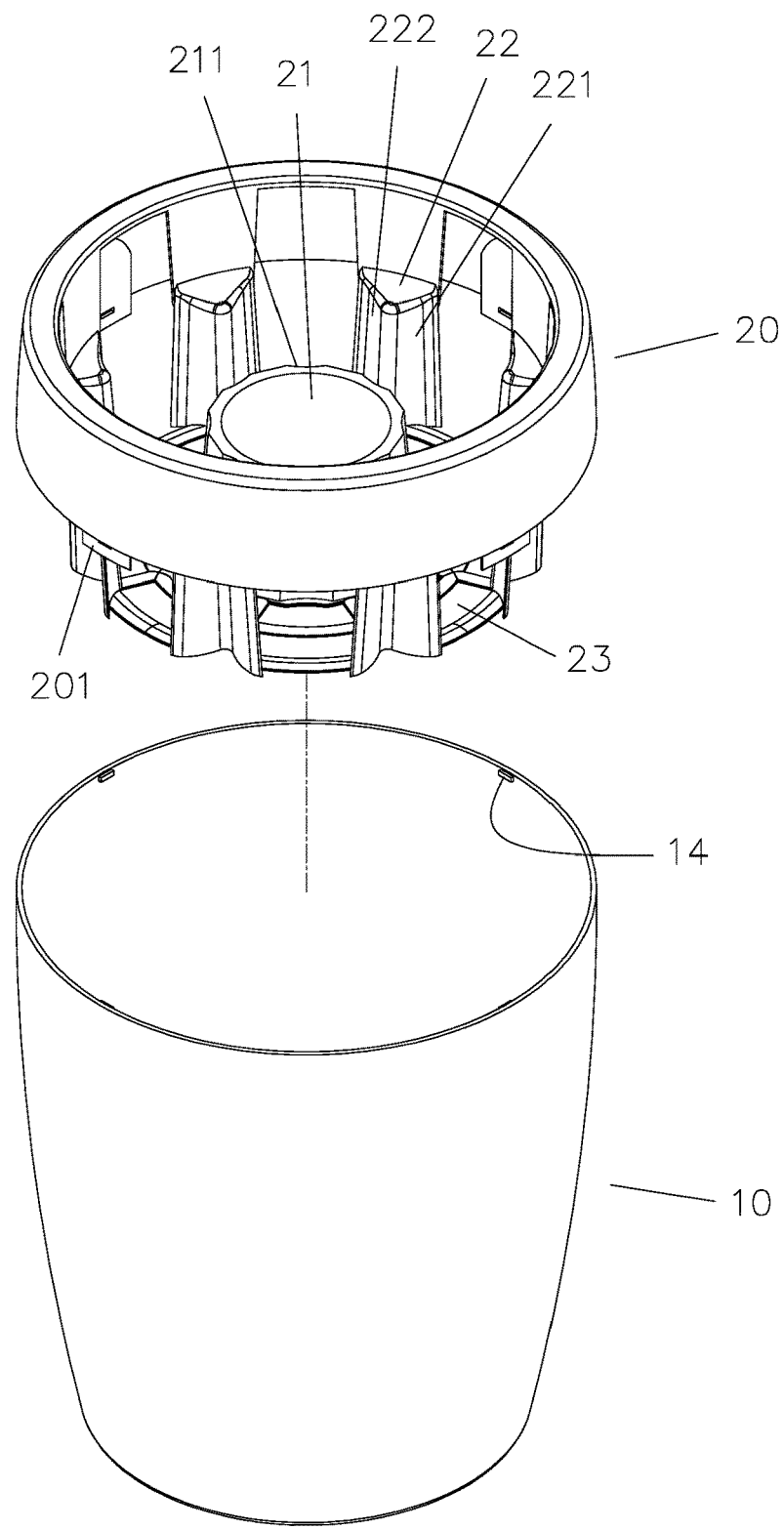
FIG. 2 is an exploded view showing the structure according to one preferred embodiment of the present invention.
Figure 3:
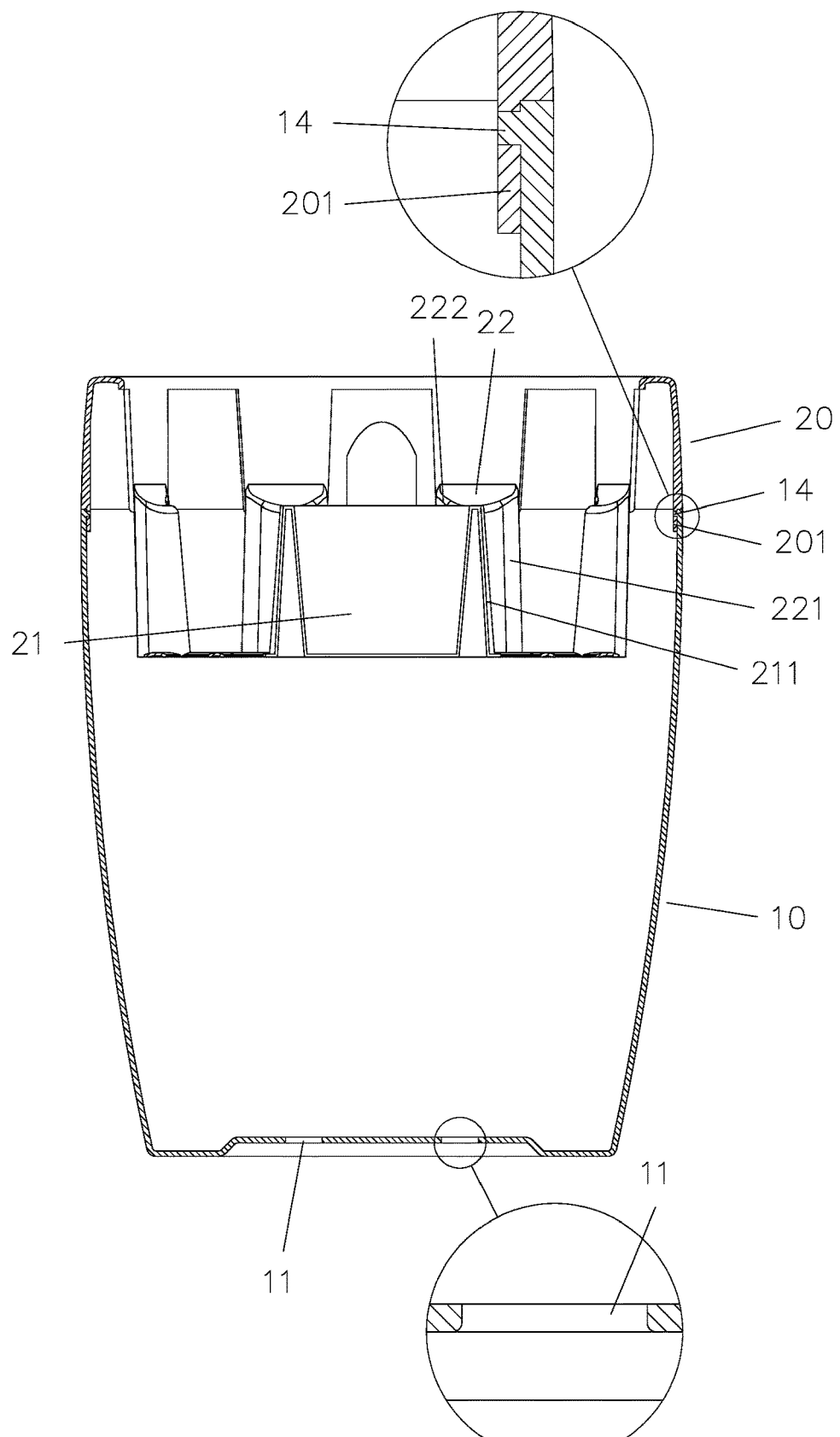
FIG. 3 is a schematic view showing the structural relation according to one preferred embodiment of the present invention.
Figure 4:
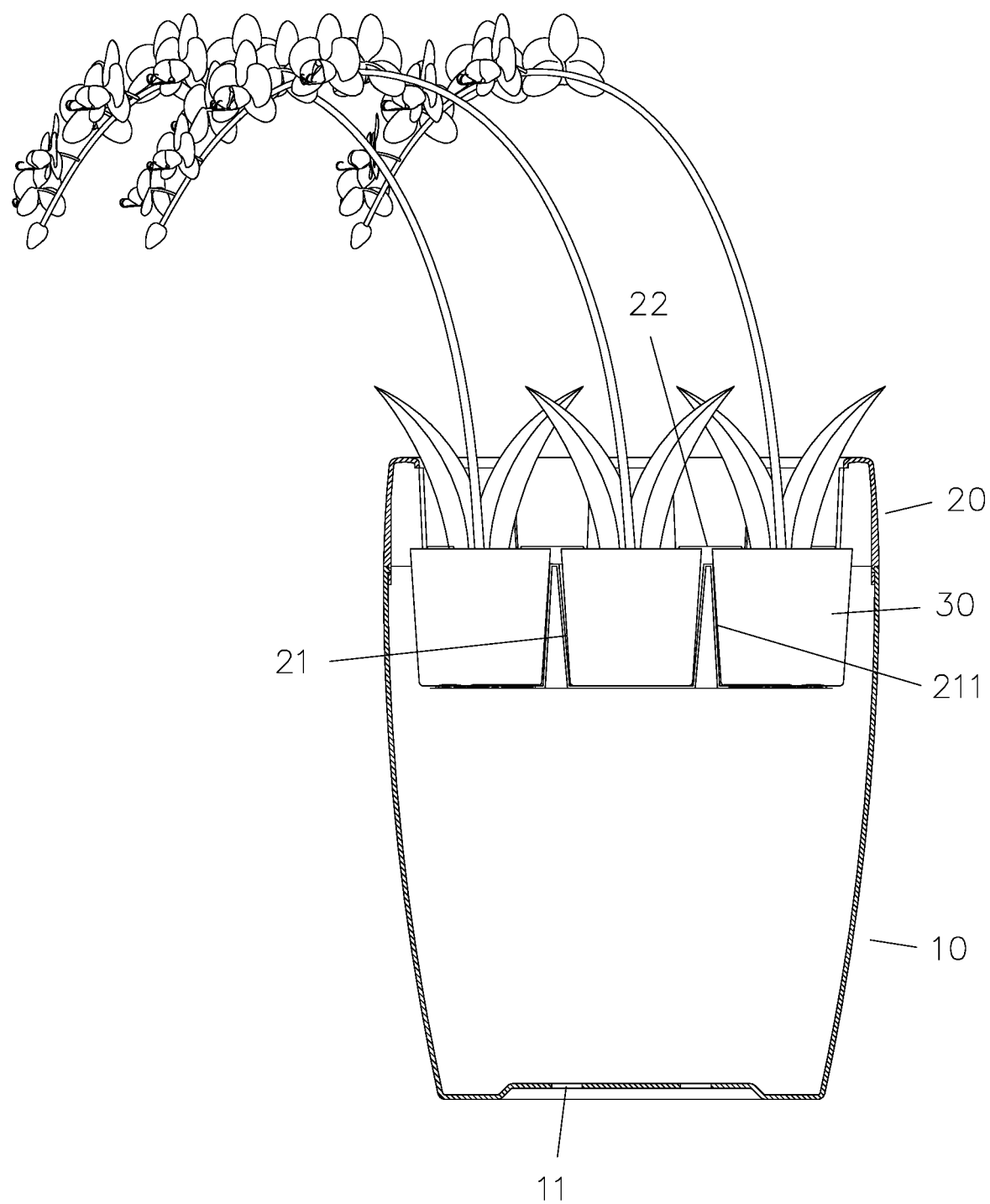
FIG. 4 is a schematic view showing an operating status relation according to one preferred embodiment of the present invention.
Figure 5:
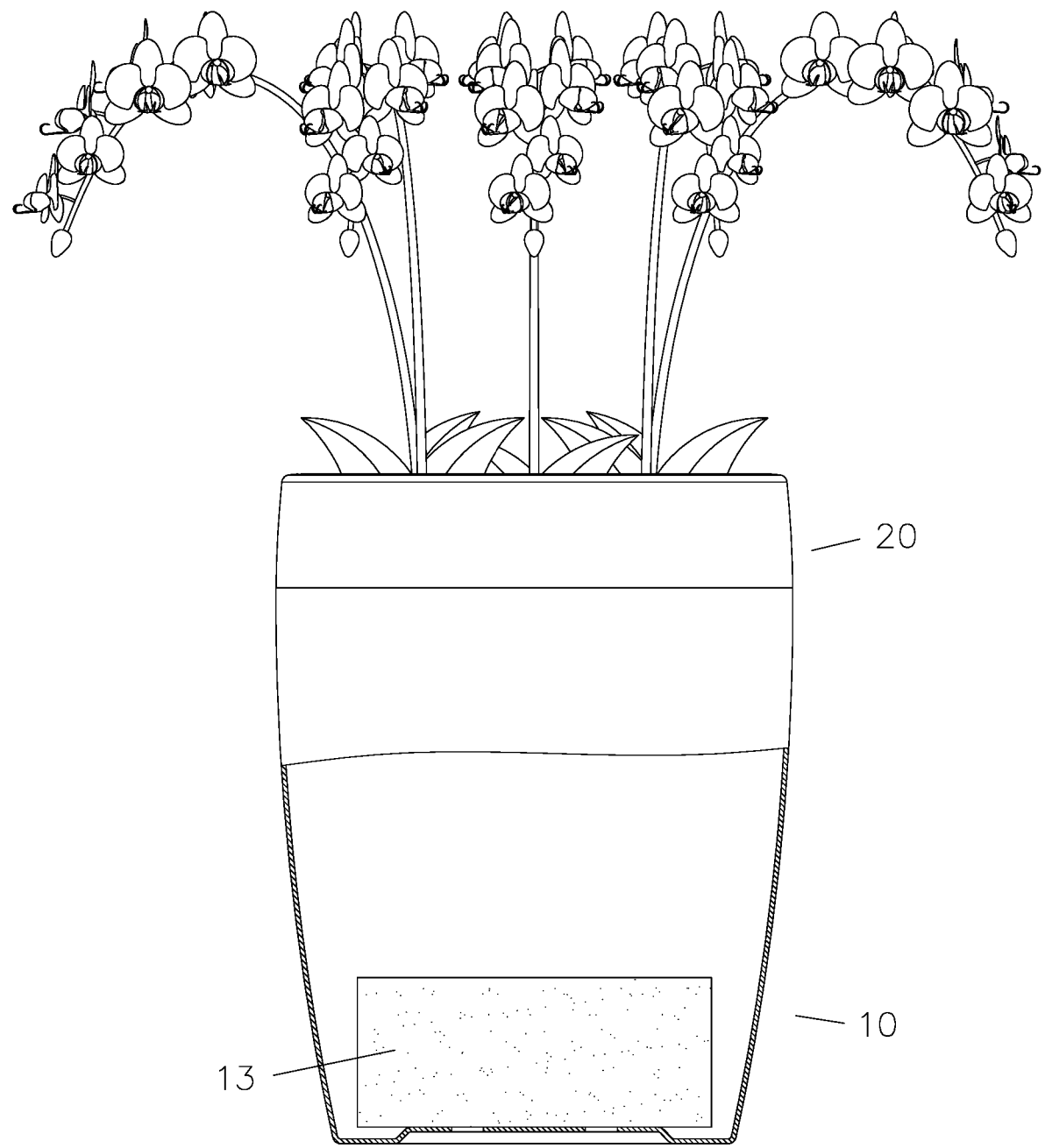
FIG. 5 is a schematic view showing a weighting balancing status according to one preferred embodiment of the present invention.
Figure 6:
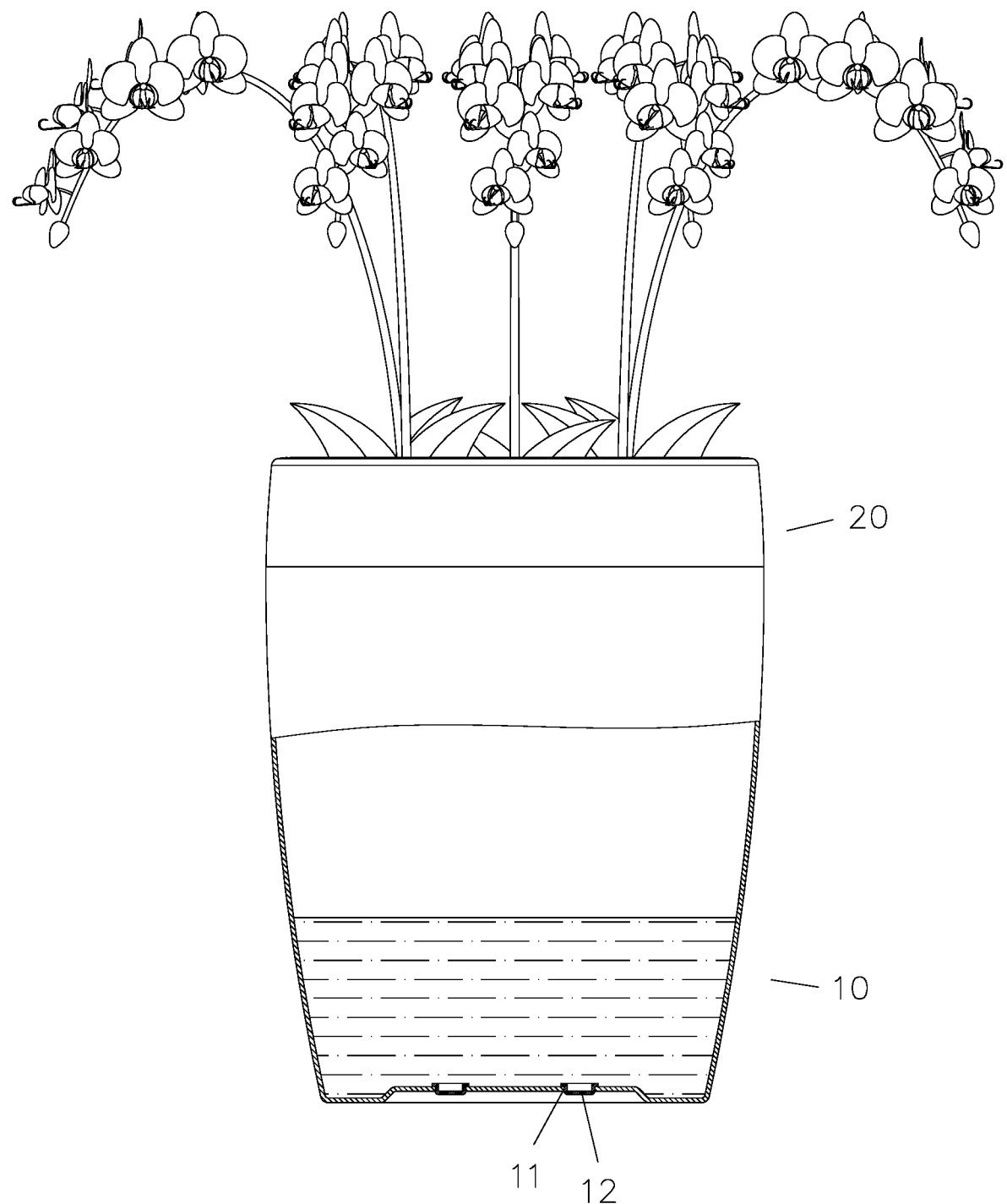
FIG. 6 is a schematic view showing a weighting balancing status according to another preferred embodiment of the present invention.

BRIEF DESCRIPTION OF CODES (10): Flow holder main body
(11): Water discharging hole
(12): Water blocking plug
(13): Weight balancing block
(14): Latching member
(20): Collecting sleeve assembly
(201): Latching sheet (21): Central accommodating slot
(211): Abutting surface
(22): Position limiting member
(221) (222): Abutting surface
(23): Rib sheet
(30): Potted plant

DETAILED DESCRIPTION OF THE
PREFERRED EMBODIMENT

Preferred embodiments of the present invention will be described with reference to the drawings for illustrating the structural assembly, the technical means and the functions to be achieved by the present invention; and the actual ratios and the arrangement of components shall not be limited by the ratios and the arrangement of components in the provided figures.

Please refer from FIG. 1 to FIG. 6, according to one preferred embodiment of the present invention, a fixing structure for collecting and assembling flower including a flower holder main body (10) and a collecting sleeve assembly (20) is disclosed. According to a structural design provided by the present invention, the flower holder main body (10) is formed as a vase or a flowerpot having a round cross section, and a height thereof can be predetermined, a bottom end thereof has a plurality of water discharging holes (11), the water discharging holes (11) can be blocked by soft water blocking plugs (12), so that water can be accommodated in the flower holder main body (10) for a purpose of weight balancing, or a weight balancing block (13) can be directly disposed in the flower holder main body (10), and a plurality of latching members (14) are disposed at an inner side edge defined at a top end of the flower holder main body (10); the collecting sleeve assembly (20) is sleeved at the top end of the flower holder main body (10); with a plurality of latching sheets (21) extended from a bottom edge of the collecting sleeve assembly (20) being latched and buckled with the latching members (14), a sleeve assembling relation can be kept between the collecting sleeve assembly (20) and the flower holder main body (10), thereby structuring a complete visual effect of flower holder; a central accommodating slot (201) and a plurality of position limiting members (22) annularly arranged along an inner edge are disposed in the collecting sleeve assembly (20), two crossed adjacent abutting surfaces (221) (222), which are in an outwardly-expanding conical status, are respectively formed in the plurality of position limiting members (22), and each of the abutting surfaces (221) (222) is formed with a preset curvature, and an inner diameter of the central accommodating slot (21) is formed with a slightly-retracting conical status, and an outer edge thereof is formed with an outwardly-expanding conical status, and a concave arc-shaped abutting surface (211) is formed between the adjacent position limiting members (22), and each of the position limiting members (22) is connected to a bottom edge of the central accommodating slot (21) via a rib sheet (23), so that an accommodating slot zone can be formed through each set of the three abutting surfaces (211) (221) (222), thereby forming the fixing structure for collecting and assembling flower provided by the present invention.

Based on the disclosed structure, when the flower collecting and assembling operation is desired to be processed, a plurality of potted plants (30), for example orchids, can be selectively disposed in the accommodating slot zones and the central accommodating slot (21) of the collecting sleeve assembly (20) according to actual needs, and directions of flower spikes of the potted plants (30) can be properly adjusted, so that an assembled large flower bonsai satisfying requirements can be provided, and the assembling operation is provided with advantages of being fast and easy, no filling material or wastes, for example styrofoam or waste fabrics, is needed, meanwhile there is no need of a professional personnel for operations, thereby greatly reducing the whole cost and solving problems and disadvantages existed in assembling the conventional large flower bonsai.

Figure 7:
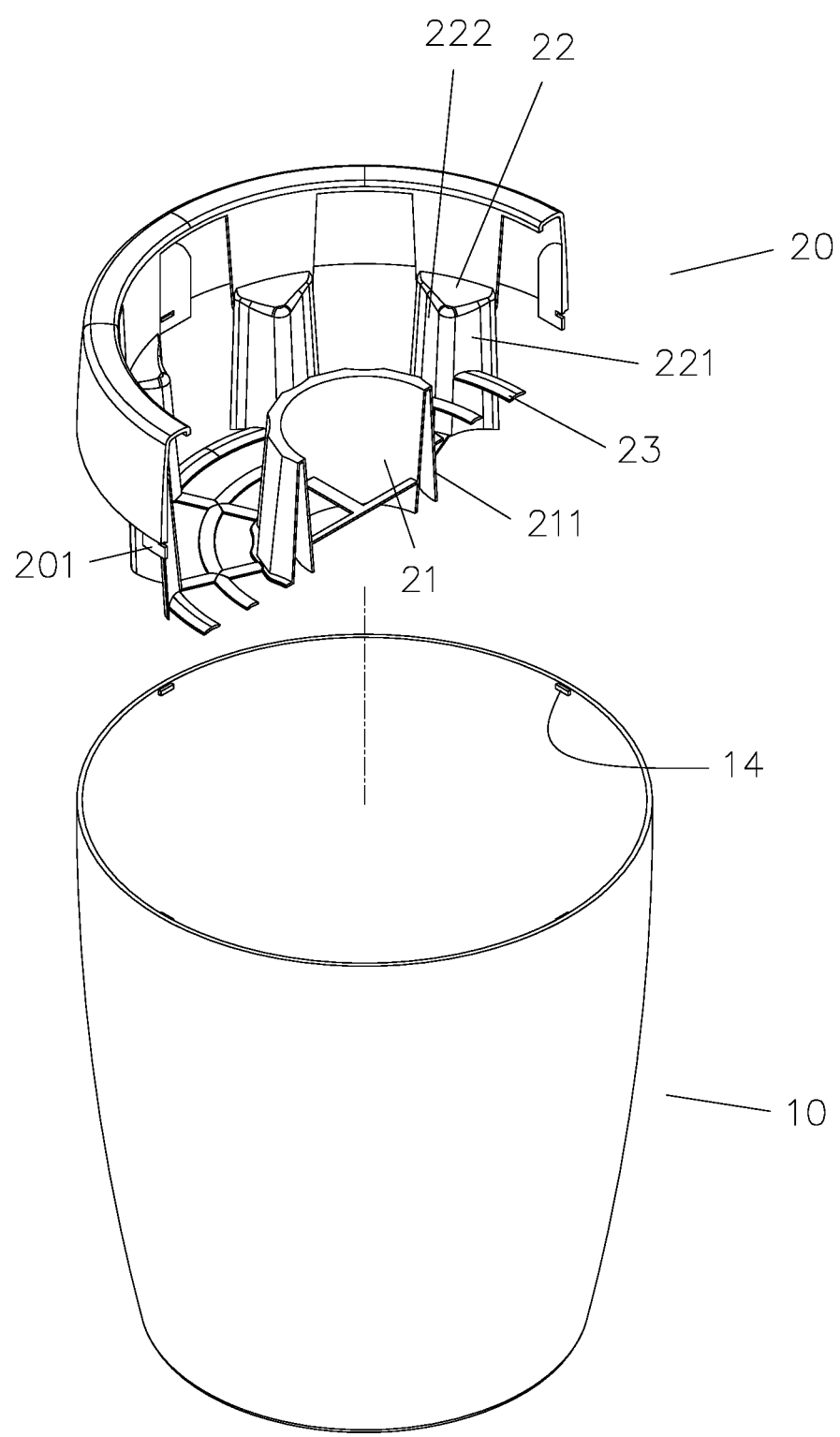
FIG. 7 is an exploded view showing the structure according to another preferred embodiment of the present invention.
Figure 8:
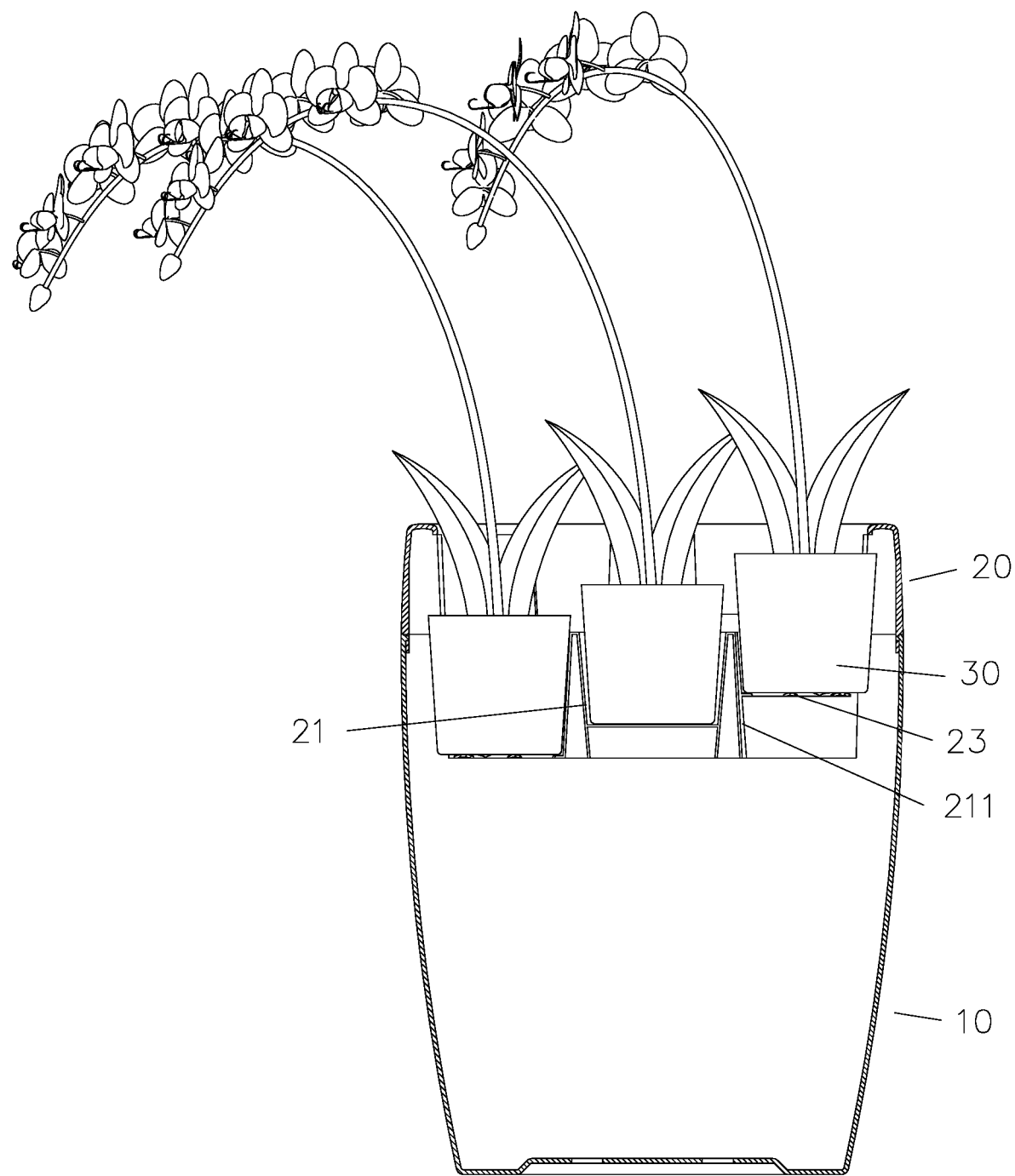
FIG. 8 is a schematic view showing the structural relation according to another preferred embodiment of the present invention.

Please refer to FIG. 7 and FIG. 8, which disclose the sleeve assembling relation according to another preferred embodiment of the present invention; under a functional frame of the central accommodating slot (21) in the collecting sleeve assembly (20) and the accommodating slot zones consisted of the plurality of position limiting members (22) arranged at the periphery, the present invention allows the connection rib sheets (23) between the bottom edge of the central accommodating slot (21) and each of the position limiting members (22) to be provided with various designs, so that a height differentiation can be formed between each of the accommodating slot zones, when the potted plants (30), for example the orchids, are placed, a height differentia effect can be provided for prettying the whole style and visual effect of the large flower bonsai, and requirements with respect various occasions and placing designs can be met.

Based on what has been disclosed above, the present invention utilizes the flower holder main body and the collecting sleeve assembly to replace the conventional ceramic flower holder, thus a problem of accidently being damaged due to collisions while being transported can be prevented, and the present invention is recyclable, and the collecting sleeve assembly having single specification is able to work with the flower holder main body with different heights for assembling the flower holder with various sizes so as to satisfying requirements of the flower holders with different sizes; with the central accommodating slot disposed in the collecting sleeve assembly and the accommodating slot zones consisted of the position limiting members, the collecting and assembling of the potted plants, for example the orchids, can be faster and easier, and no additional filling material, for example the styrofoam, is needed, and there is no need of the professional personnel for operations; accordingly, the present invention is more practical in use and more suitable to be applied in industrial use comparing to the conventional assembling means of large flower bonsai.

Based on what has been disclosed above, the fixing structure for collecting and assembling flower provided by present invention utilizes the flower holder main body and the collecting sleeve assembly, and the central accommodating slot disposed in the collecting sleeve assembly and the accommodating slot zones consisted of the position limiting members, thus there is no need of the professional personnel for selectively placing the potted plants, for example the orchids, in the desired accommodating slot zones or the central accommodating slot, so that the collecting, assembling and fixing the potted plants can be effectively finished, and the problems and disadvantages existed in the conventional structure can be completely solved; accordingly, the present invention is more practical in use and more suitable to be applied in industrial use comparing to prior arts.

What is claimed is:
1. A fixing structure for collecting and assembling flower, comprising a flower holder main body and a collecting sleeve assembly, wherein the flower holder main body is formed with a preset height, the collecting sleeve assembly is sleeved at a top end of the flower holder main body; and further comprising:

a central accommodating slot is formed in the collecting sleeve assembly, a plurality of position limiting members are annularly disposed along an inner edge of the collecting sleeve assembly, two crossed adjacent abutting surfaces, which are in an outwardly-expanding conical status, are respectively formed in the plurality of position limiting members, and each of the abutting surfaces is formed with a preset curvature, and an inner diameter of the central accommodating slot is formed with a slightly-retracting conical status, and an outer edge thereof is formed with an outwardly-expanding conical status, and the outer edge is formed with a plurality of concave arc-shaped abutting surfaces at locations corresponding to each of the adjacent position limiting members, and each of the position limiting members is connected to a bottom edge of the central accommodating slot via a rib sheet, so that an accommodating slot zone is formed through each set formed by one of the concave arc-shaped abutting surfaces and the corresponding two crossed adjacent abutting surfaces, and the accommodating slot zones and the central accommodating slot allow potted plants to be disposed and positioned therein, thereby forming the fixing structure for collecting and assembling flower having an advantage of being configured to be assembled and fixed.

2. The fixing structure for collecting and assembling flower as claimed in claim 1, wherein each of the rib sheets between the bottom edge of the central accommodating slot and each of the position limiting members is provided with various designs, so that a height differentiation is configured to be formed between each of the accommodating slot zones, so that when the potted plants are placed, a natural height differentia effect is configured to be provided.

3. The fixing structure for collecting and assembling flower as claimed in claim 1, wherein a plurality of latching members are disposed at an inner side edge defined at a top end of the flower holder main body, a plurality of latching sheets are correspondingly extended from a bottom edge of the collecting sleeve assembly, with the plurality of latching sheets at the bottom edge of the collecting sleeve assembly being latched and buckled with the latching members, a sleeve assembling relation is able to be kept between the collecting sleeve assembly and the flower holder main body.

4. The fixing structure for collecting and assembling flower as claimed in claim 1, wherein a weight balancing block is disposed in the flower holder main body for a purpose of weight balancing.

5. The fixing structure for collecting and assembling flower as claimed in claim 1, wherein water discharging holes, which are blocked by soft water blocking plugs, are formed at a bottom end of the flower holder main body, so that water is able to be accommodated in the flower holder main body for a purpose of weight balancing.

* * * * *